US011373089B2

(12) United States Patent
Englund

(10) Patent No.: US 11,373,089 B2
(45) Date of Patent: Jun. 28, 2022

(54) SERIALIZED ELECTRO-OPTIC NEURAL NETWORK USING OPTICAL WEIGHTS ENCODING

(71) Applicant: Massachusetts Institute of Technology, Cambridge, MA (US)

(72) Inventor: Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 769 days.

(21) Appl. No.: 16/268,578

(22) Filed: Feb. 6, 2019

(65) Prior Publication Data

US 2019/0244090 A1 Aug. 8, 2019

Related U.S. Application Data

(60) Provisional application No. 62/626,902, filed on Feb. 6, 2018.

(51) Int. Cl.

*G06N 3/067* (2006.01)
*G06N 3/04* (2006.01)
*G06N 3/08* (2006.01)

(52) U.S. Cl.

CPC ............ *G06N 3/0675* (2013.01); *G06N 3/04* (2013.01); *G06N 3/08* (2013.01)

(58) Field of Classification Search

CPC .......... G06N 3/04; G06N 3/0675; G06N 3/08
See application file for complete search history.

(56) References Cited

U.S. PATENT DOCUMENTS 4,567,569 A 1/1986 Caulfield et al.
4,633,428 A 12/1986 Byron
(Continued)

FOREIGN PATENT DOCUMENTS

CN 101630178 A 1/2010
WO 2005029404 A2 3/2005
(Continued)

OTHER PUBLICATIONS

Whitfield, J. D. et al., "Simulation of electronic structure Hamiltonians using quantum computers", Molecular Physics 109, 735 (Dec. 19, 2010), 22 pages.
(Continued)

*Primary Examiner* — Benjamin P Geib
(74) *Attorney, Agent, or Firm* — Smith Baluch LLP

(57) ABSTRACT

Most artificial neural networks are implemented electronically using graphical processing units to compute products of input signals and predetermined weights. The number of weights scales as the square of the number of neurons in the neural network, causing the power and bandwidth associated with retrieving and distributing the weights in an electronic architecture to scale poorly. Switching from an electronic architecture to an optical architecture for storing and distributing weights alleviates the communications bottleneck and reduces the power per transaction for much better scaling. The weights can be distributed at terabits per second at a power cost of picojoules per bit (versus gigabits per second and femtojoules per bit for electronic architectures). The bandwidth and power advantages are even better when distributing the same weights to many optical neural networks running simultaneously.

14 Claims, 10 Drawing Sheets

100
111a 140a 150 130a 131 140b 130b 130j 140k 130k 113k
160
121a 120a 120b 121b 120k 121k
110a 110b 110k

(56) References Cited

U.S. PATENT DOCUMENTS 5,004,309 A 4/1991 Caulfield et al.
5,077,619 A 12/1991 Toms
5,095,459 A 3/1992 Ohta et al.
5,167,007 A * 11/1992 Toyoda ................ G06N 3/0675 706/40
5,297,232 A 3/1994 Murphy
5,428,711 A 6/1995 Akiyama et al.
5,699,449 A 12/1997 Javidi
6,005,998 A 12/1999 Lee
7,173,272 B2 2/2007 Ralph
7,660,533 B1 2/2010 Meyers et al.
7,667,995 B1 2/2010 Leuenberger et al.
7,876,248 B2 1/2011 Berkley et al.
7,985,965 B2 7/2011 Barker et al.
8,018,244 B2 9/2011 Berkley
8,023,828 B2 9/2011 Beausoleil et al.
8,035,540 B2 10/2011 Berkley et al.
8,190,553 B2 5/2012 Routt
8,223,414 B2 7/2012 Goto et al.
8,386,899 B2 2/2013 Goto et al.
8,463,721 B2 * 6/2013 Prokhorov ............. G06N 3/049 706/20
8,560,282 B2 10/2013 Macready et al.
8,565,600 B2 10/2013 McGreer et al.
8,604,944 B2 12/2013 Berkley et al.
8,620,855 B2 12/2013 Bonderson
8,837,544 B2 9/2014 Santori et al.
9,250,391 B2 2/2016 McLaughlin et al.
9,354,039 B2 5/2016 Mower et al.
9,432,750 B1 8/2016 Li
9,791,258 B2 10/2017 Mower et al.
9,858,531 B1 1/2018 Monroe et al.
10,268,232 B2 4/2019 Harris et al.
10,359,272 B2 7/2019 Mower et al.
10,608,663 B2 3/2020 Gould et al.
10,634,851 B2 4/2020 Steinbrecher et al.
10,768,659 B2 9/2020 Carolan et al.
2003/0086138 A1 5/2003 Pittman et al.
2003/0235363 A1 12/2003 Pfeiffer
2004/0243657 A1 12/2004 Goren et al.
2007/0180586 A1 8/2007 Amin
2008/0031566 A1 2/2008 Matsubara et al.
2008/0212186 A1 9/2008 Zoller et al.
2008/0273835 A1 11/2008 Popovic
2009/0028554 A1 1/2009 Anderson et al.
2012/0171619 A1 7/2012 Heyderman et al.
2013/0011093 A1 1/2013 Goh et al.
2014/0241657 A1 8/2014 Manouvrier
2014/0299743 A1 10/2014 Miller
2015/0354938 A1 12/2015 Mower et al.
2015/0382089 A1 12/2015 Mazed
2016/0103281 A1 4/2016 Matsumoto
2016/0118106 A1 4/2016 Yoshimura et al.
2016/0162798 A1 6/2016 Marandi et al.
2016/0342887 A1 * 11/2016 Tieleman ............... G06N 3/084
2017/0031101 A1 2/2017 Miller
2017/0285373 A1 10/2017 Zhang et al.
2017/0302396 A1 * 10/2017 Tait ...................... H04B 10/275
2017/0351293 A1 12/2017 Carolan et al.
2018/0267937 A1 9/2018 Pelc et al.
2018/0274900 A1 9/2018 Mower et al.
2018/0335574 A1 11/2018 Steinbrecher et al.
2019/0019100 A1 1/2019 Roques-Carmes et al.
2019/0266508 A1 8/2019 Bunyk et al.
2020/0018193 A1 1/2020 Neiser
2020/0284989 A1 9/2020 Steinbrecher et al.

FOREIGN PATENT DOCUMENTS

WO 2006023067 A2 3/2006
WO 2008069490 A1 6/2008
WO 2018098230 A1 5/2018

OTHER PUBLICATIONS

Wu et al., "An optical fiber network oracle for NP-complete problems," Light: Science & Applications, vol. 3, pp. e147-e147, Feb. 2014.

Xia, F., et al., "Mode conversion losses in silicon-on-insulator photonic wire based racetrack resonators", Optics Express, vol. 14, No. 9, (2006), p. 3872-3886.

Xu et al., "Experimental observations of bistability and instability in a two-dimensional nonlinear optical superlattice," Phys. Rev. Lett. 71, pp. 3959-3962 (1993).

Xue, P., et al., "Observation of quasiperiodic dynamics in a one-dimensional quantum walk of single photons in space," New J. Phys. 16 053009 (May 6, 2014), 11 pages.

Yang, M. et al., "Non-Blocking 4x4 Electro-Optic Silicon Switch for On-Chip Photonic Networks", Opt. Express, vol. 19, No. 1, (Dec. 20, 2010), p. 47-54.

Yao et al., Serial-parallel multipliers. In Signals, Systems and Computers, 1993. 1993 Conference Record of The Twenty-Seventh Asilomar Conference on, 359-363 (IEEE, 1993).

Young et al., Recent trends in deep learning based natural language processing. IEEE Computational Intelligence Magazine 13, 55-75 (2018).

Zhou, X.-Q., et al., "Calculating Unknown Eigenvalues with a Quantum Algorithm", Nat. Photon 7, (2013), pp. 223-228.

Raussendorf, R. et al., "A one-way quantum computer", Phys. Rev. Lett. 86, 5188-5191 (2001).

Rechtsman et al., "Photonic floquet topological insulators," Optical Society of America, Technical Digest, 2 pages (2013).

Reck et al., Experimental realization of any discrete unitary operator. Physical review letters 73, 58 (1994).

Reed, G. T. et al., "Silicon optical modulators", Nature Photonics, vol. 4, (2010), pp. 518-526.

Rendl et al., "Solving Max-Cut to optimality by intersecting semidefinite and polyhedral relaxations," Mathematical Programming, vol. 121, pp. 307-335, Feb. 2010.

Rios et al., "Integrated all-photonic non-volatile multilevel memory," Nature Photonics 9, pp. 725-732 (2015).

Rogalski, Progress in focal plane array technologies. Progress in Quantum Electronics 36, 342-473 (2012).

Rohit, A. et al., "8x8 space and wavelength selective cross-connect for simultaneous dynamic multi-wavelength routing", In Optical Fiber Communication Conference, OW1C{4 (Optical Society of America, (2013), 3 pages.

Rosenblatt, The perceptron: a probabilistic model for information storage and organization in the brain. Psychological Review 65, 386 (1958). 23 pages.

Russakovsky et al. ImageNet Large Scale Visual Recognition Challenge. International Journal of Computer Vision (IJCV) 115, 211-252 (2015).

Saade et al., "Random projections through multiple optical scattering: Approximating Kernels at the speed of light," in 2016 IEEE International Conference on Acoustics, Speech and Signal Processing (ICASSP), pp. 6215-6219, IEEE, Mar. 2016.

Salandrino, A. et al., "Analysis of a three-core adiabatic directional coupler", Optics Communications, vol. 282, (2009), pp. 4524-4526.

Schaeff et al., "Scalable fiber integrated source for higher-dimensional path-entangled photonic quNits." Optics Express 20.15 (2012): 16145-16153.

Schirmer et al., "Nonlinear mirror based on two-photon absorption," Journal of the Optical Society of America B, vol. 14, p. 2865, Nov. 1997. 4 pages.

Schmidhuber, J., "Deep learning in neural networks: An overview," Neural Networks 61, pp. 85-117 (2015).

Schreiber, A. et al., "Decoherence and Disorder in Quantum Walks: From Ballistic Spread to Localization", Phys. Rev. Lett., 106, (Jan. 13, 2011), 5 pages.

Schwartz, T. et al., "Transport and Anderson localization in disordered two-dimensional photonic lattices", Nature, vol. 446, (Mar. 1, 2007), p. 52-55.

Selden, "Pulse transmission through a saturable absorber," British Journal of Applied Physics 18, 743 (1967). 7 pages.

(56) References Cited

OTHER PUBLICATIONS

Shafiee et al., "ISAAC: A convolutional neural network accelerator with in-situ analog arithmetic in crossbars," ACM/IEEE 43rd Annual International Symposium on Computer Architecture, In Proc. ISCA, 13 pages (2016).
Shen et al., "Deep learning with coherent nanophotonic circuits," Nature Photonics. Jun. 2017. 7 pages.
Shoji, Y. et al., "Low-crosstalk 2×2 thermo-optic switch with silicon wire waveguides," Optics Express 18(9), 9071-9075., published Apr. 15, 2010.
Silver et al. Mastering chess and shogi by self-play with a general reinforcement learning algorithm. arXiv preprint arXiv:1712.01815 (2017). 19 pages.
Silver et al., Mastering the game of go with deep neural networks and tree search, Nature 529, pp. 484-489 (2016).
Silverstone, J. et al., "On-chip quantum interference between silicon photon-pair sources", Nat. Photon., advanced online publication (2013), 5 pages.
Smith et al., "Phase-controlled integrated photonic quantum circuits." Optics Express 17.16 (2009): 13516-13525.
Soljacic et al., "Optimal bistable switching in nonlinear photonic crystals," Physical Review E, vol. 66, p. 055601, Nov. 2002. 4 pages.
Solli et al., "Analog optical computing." Nature Photonics 9.11 (2015): 704. 3 pages.
Spring, J. B. et al., "Boson sampling on a photonic chip", Science 339, (2013), 24 pages.
Srinivasan et al., 56 GB/s germanium waveguide electro-absorption modulator. Journal of Lightwave Technology 34, 419-424 (2016).
Steinkraus et al., Using GPUs for machine learning algorithms. In Document Analysis and Recognition, 2005. Proceedings. Eighth International Conference on, 1115-1120 (IEEE, 2005).
Suda et al., "Quantum interference of photons in simple networks." Quantum information processing 12.5 (2013): 1915-1945.
Sun et al., Single-chip microprocessor that communicates directly using light. Nature 528, 534-538 (2015).
Sun, J. et al., "Large-scale nanophotonic phased array", Nature, vol. 493, (Jan. 10, 2013), p. 195-199.
Suzuki, K. et al., "Ultra-compact 8×8 strictly-non-blocking Si-wire PILOSS switch," Optics Express 22(4), 3887-3894 (2014).
Sze et al., Efficient processing of deep neural networks: A tutorial and survey. Proceedings of the IEEE 105, 2295-2329 (2017).
Tabla,"Experimental scheme for qubit and qutrit symmetric informationally complete positive operator-valued measurements using multiport devices." Physical Review A 86.6 (2012): 062107. 8 pages.
Tait et al., "Broadcast and weight: An integrated network for scalable photonic spike processing," Journal of Lightwave Technology, vol. 32, No. 21, pp. 3427-3439, 2014.
Tait et al., "Photonic Neuromorphic Signal Processing and Computing," pp. 183-222, Springer, Berlin, Heidelberg, 2014.
Tait et al., Neuromorphic photonic networks using silicon photonic weight banks. Scientific Reports 7, 7430 (2017). 10 pages.
Tanabe et al., "Fast bistable all-optical switch and memory on a silicon photonic crystal on-chip," Opt. Lett. 30, pp. 2575-2577 (2005).
Tanizawa, K. et al., "Ultra-compact 32×32 strictly-non-blocking Si-wire optical switch with fan-out LGA interposer," Optics Express 23(13), 17599-17606 (2015).
Thompson, M. G. et al., "Integrated waveguide circuits for optical quantum computing", IET Circuits Devices Syst., 2011, vol. 5, Iss. 2, pp. 94-102.
Timurdogan et al., An ultralow power athermal silicon modulator. Nature Communications 5, 4008 (2014). 11 pages.
Vandoorne et al., "Experimental demonstration of reservoir computing on a silicon photonics chip," Nature Communications, vol. 5, p. 3541, Dec. 2014.
Vazquez et al., "Optical NP problem solver on laser-written waveguide plat-form," Optics Express, vol. 26, p. 702, Jan. 2018. 9 pages.
Vivien et al., "Zero-bias 40gbit/s germanium waveguide photodetector on silicon," Opt. Express 20, 1096-1101 (2012).
W. A. Little, "The existence of persistent states in the brain," Mathematical Biosciences, vol. 19, No. 1-2, 1974. 20 pages.
Wang et al., "Coherent Ising machine based on degenerate optical parametric oscillators," Physical Review A, vol. 88, p. 063853, Dec. 2013. 9 pages.
Wang et al., Deep learning for identifying metastatic breast cancer. arXiv preprint arXiv:1606.05718 (2016).6 pages.
Werbos, Beyond regression: New tools for prediction and analysis in the behavioral sciences. Ph.D. dissertation, Harvard University (1974). 454 pages.
Fushman, I. et al., "Controlled Phase Shifts with a Single Quantum Dot", Science, vol. 320, (May 9, 2008), p. 769-772.
George et al., A programmable and configurable mixed-mode FPAA SoC. IEEE Transactions on Very Large Scale Integration (VLSI) Systems 24, 2253-2261 (2016).
Gilmer et al., Neural message passing for quantum chemistry. arXiv preprint arXiv:1704.01212 (2017). 14 pages.
Golub et al., "Calculating the singular values and pseudo-inverse of a matrix," Journal of the Society for Industrial and Applied Mathematics Series B Numerical Analysis, vol. 2, No. 2, pp. 205-224 (1965).
Graves et al., "Hybrid computing using a neural network with dynamic external memory," Nature, vol. 538, 21 pages (2016).
Green, W. et al., "CMOS Integrated Silicon Nanophotonics: Enabling Technology for Exascale Computational System", IBM Corporation, (Invited Talk at SEMICON 2010, Chiba, Japan, Dec. 1, 2010), 30 pages.
Grote et al., First long-term application of squeezed states of light in a gravitational-wave observatory. Physical Review Letters 110, 181101 (2013). 5 pages.
Gruber et al., "Planar-integrated optical vector-matrix multiplier," Applied Optics, vol. 39, p. 5367, Oct. 2000. 7 pages.
Gullans, M., et al., "Single-Photon Nonlinear Optics with Graphene Plasmons", Phys. Rev. Lett. 111, (Dec. 13, 2013), p. 247401-1-247401-5.
Gunn, C., "CMOS photonics for high-speed interconnects", Micro, IEEE 26, (Mar.-Apr. 2006), p. 58-66.
Haffner et al., Low-loss plasmon-assisted electro-optic modulator. Nature 556, 483 (2018). 17 pages.
Halasz et al., "Phase diagram of QCD," Physical Review D, vol. 58, p. 096007, Sep. 1998. 11 pages.
Hamerly et al., "Scaling advantages of all-to-all connectivity in physical annealers: the Coherent Ising Machine vs. D-Wave 2000Q," arXiv preprints, May 2018. 17 pages.
Harris et al. "Integrated source of spectrally filtered correlated photons for large-scale quantum photonic systems." Physical Review X 4.4 (2014): 041047. 10 pages.
Harris et al., "Bosonic transport simulations in a large-scale programmable nanophotonic processor," arXiv preprint arXiv:1507.03406, 2015. 8 pages.
Harris, N.C. et al. "Efficient, Compact and Low Loss Thermo-Optic Phase Shifter in Silicon", Optics Express, (Oct. 14, 2014), pp. 10487-10493.
Hinton et al., "Reducing the dimensionality of data with neural networks," Science 313, pp. 504-507 (2006).
Hochberg, M. et al., "Silicon Photonics: The Next Fabless Semiconductor Industry", Solid-State Circuits Magazine, IEEE 5, 48 (Feb. 4, 2013), 11 pages.
Honerkamp-Smith et al., "An introduction to critical points for biophysicists; observations of compositional heterogeneity in lipid membranes," Biochimica et Biophysica Acta (BBA)—Biomembranes, vol. 1788, pp. 53-63, Jan. 2009.
Hong, C. K. et al., "Measurement of subpicosecond time intervals between two photons by interference", Phys. Rev. Lett., vol. 59, No. 18, (Nov. 2, 1987), p. 2044-2046.
Hopefield et al., "Neural computation of decisions in optimization problems," Biological Cybernetics, vol. 52, No. 3, pp. 141-152. 1955.

(56) References Cited

OTHER PUBLICATIONS

Hopefield, "Neural networks and physical systems with emergent collective computational abilities.," Proceedings of the National Academy of Sciences of the United States of America, vol. 79, pp. 2554-2558, Apr. 1982.
Horowitz, Computing's energy problem (and what we can do about it). In Solid-State Circuits Conference Digest of Technical Papers (ISSCC), 2014 IEEE International, 10-14 (IEEE, 2014).
Horst, F. et al., "Cascaded Mach-Zehnder wavelength filters in silicon photonics for low loss and flat pass-band WDM (de-)multiplexing", Optics Express, vol. 21, No. 10, (Mar. 5, 2013), pp. 11652-11658.
Humphreys, P. C. et al., "Linear Optical Quantum Computing in a Single Spatial Mode", arXiv: 1305.3592, (Nov. 21, 2013), 7 pages.
Inagaki et al., Large-scale ising spin network based on degenerate optical parametric oscillators. Nature Photonics 10, 415(2016).
Isichenko, "Percolation, statistical topography, and trans-port in random media," Reviews of Modern Physics, vol. 64, pp. 961-1043, Oct. 1992.
Jaekel et al., Quantum limits in interferometric measurements. EPL (Europhysics Letters) 13, 301 (1990).
Jalali, B. et al., "Silicon Photonics", Journal of Lightwave Technology, vol. 24, No. 12, (Dec. 2006), pp. 4600-4615.
Jia et al., "Caffe: Convolutional architecture for fast feature embedding," In Proceedings of the 22Nd ACM International Conference on Multimedia, MM '14, pp. 675-678 (ACM, New York, NY, USA, 2014). URL http://doi.acm.org/10.1145/2647868.2654889.
Jiang, L. et al., "A planar ion trapping microdevice with integrated waveguides for optical detection", Optics Express, vol. 19, No. 4, (2011), pp. 3037-3043.
Jonsson, An empirical approach to finding energy efficient ADC architectures. In Proc. of 2011 IMEKO IWADC & IEEE ADC Forum, 1-6 (2011).
Jouppi et al. In-datacenter performance analysis of a tensor processing unit. In Computer Architecture (ISCA), 2017 ACM/IEEE 44th Annual International Symposium on, 1-12 (IEEE, 2017).
Kahn et al., Communications expands its space. Nature Photonics 11, 5 (2017). 4 pages.
Kardar et al., "Dynamic Scaling of Growing Interfaces," Physical Review Letters, vol. 56, pp. 889-892, Mar. 1986.
Karpathy, A., "CS231n Convolutional Neural Networks for Visual Recognition," Class notes. Jan. 2018, http://cs231n.github.io/. Accessed Oct. 31, 2018. 2 pages.
Keckler et al., GPUs and the future of parallel computing. IEEE Micro 7-17 (2011).
Kieling, K. et al., "On photonic Controlled Phase Gates", New Journal of Physics, vol. 12, (Jul. 5, 2010), 9 pages.
Kilper et al., Optical networks come of age, Opt. Photon. News, vol. 25, pp. 50-57, Sep. 2014.
Kim et al., A functional hybrid memristor crossbar-array/cmos system for data storage and neuromorphic applications. Nano Letters 12, 389-395 (2011).
Kirkpatrick et al., "Optimization by simulated annealing.," Science (New York, N.Y.), vol. 220, pp. 671-680, May 1983.
Knill et al., "The Bayesian brain: the role of uncertainty in neural coding and computation," Trends in Neurosciences, vol. 27, pp. 712-719, Dec. 2004.
Knill, E. et al., "A scheme for efficient quantum computation with linear optics", Nature 409, 4652 (Jan. 4, 2001), p. 46-52.
Knill, E., "Quantum computing with realistically noisy devices", Nature, vol. 434, (Mar. 3, 2005), p. 39-44.
Kok et al. "Linear optical quantum computing with photonic qubits." Reviews of Modern Physics 79.1 (2007): 135.40 pages.
Koos et al., Silicon-organic hybrid (SOH) and plasmonic-organic hybrid (POH) integration. Journal of Lightwave Technology 34, 256-268 (2016).
Krizhevsky et al., Imagenet classification with deep convolutional neural networks. In Advances in neural information processing systems, 1097-1105 (2012).
Kucherenko, S. et al., "Application of Deterministic Low-Discrepancy Sequences in Global Optimization", Computational Optimization and Applications, vol. 30, (2005), p. 297-318.
Kwack, M-J et al., "Monolithic InP strictly non-blocking 8×8 switch for high-speed WDM optical interconnection," Optics Express 20(27), 28734-28741 (2012).
Lahini, Y. et al., "Anderson Localization and Nonlinearity in One-Dimensional Disordered Photonic Lattices", Phys. Rev. Lett., 100, (Feb. 7, 2008), 4 pages.
Lahini, Y. et al., "Quantum Correlations in Two-Particle Anderson Localization", Phys. Rev. Lett., 105, (Oct. 15, 2010), p. 163905-1-163905-4.
Laing, A. et al., "High-fidelity operation of quantum photonic circuits", Applied Physics Letters, vol. 97, (2010), 5 pages.
Landauer, Irreversibility and heat generation in the computing process. IBM Journal of Research and Developments, 183-191 (1961).
Lanyon, B. P. et al., "Towards quantum chemistry on a quantum computer", Nature Chemistry 2, 106 (May 8, 2009), 20 pages.
Lawson et al., Basic linear algebra subprograms for Fortran usage. ACM Transactions on Mathematical Software (TOMS) 5, 308-323 (1979).
Lecun et al., "Deep learning," Nature, vol. 521, pp. 436-444, May 2015.
Lecun et al., Gradient-based learning applied to document recognition. Proceedings of the IEEE 86, 2278-2324 (1998).
Levi, L. et al., "Hyper-transport of light and stochastic acceleration by evolving disorder", Nat. Phys., vol. 8, (Dec. 2012), p. 912-917.
Li et al., Efficient and self-adaptive in-situ learning in multilayer memristor neural networks. Nature Communications 9, 2385 (2018). 8 pages.
Lin et al., All-optical machine learning using diffractive deep neural networks. Science 361, 1004-1008 (2018).
Lu et al., "16×16 non-blocking silicon optical switch based on electro-optic Mach-Zehnder interferometers," Optics Express, vol. 24, No. 9, 13 pages, DOI:10.1364/OE.24.009295 (Apr. 20, 2016).
Ma et al., "Optical switching technology comparison: optical mems vs. Other technologies," IEEE communications magazine, vol. 41, No. 11, pp. S16-S23, 2003.
MacReady et al., "Criticality and Parallelism in Combinatorial Optimization," Science, vol. 271, pp. 56-59, Jan. 1996.
Marandi et al., Network of time-multiplexed optical parametric oscillators as a coherent Ising machine. Nature Photonics 8, 937 (2014). 6 pages.
Martin-Lopez, E. et al., "Experimental realization of Shor's quantum factoring algorithm using qubit recycling", Nat Photon 6, (Oct. 24, 2012), 7 pages.
McMahon et al., "A fully programmable 100-spin coherent Ising machine with all-to-all connections.," Science (New York, N.Y.), vol. 354, pp. 614-617, Nov. 2016.
Mead, "Neuromorphic electronic systems," Proceedings of the IEEE 78, 1629-1636 (1990).
Migdall, A. L. et al., "Tailoring single-photon and multiphoton probabilities of a single-photon on-demand source", Phys. Rev. A 66, (May 22, 2002), 4 pages.
Mikkelsen, J.C. et al., "Dimensional variation tolerant silicon-on-insulator directional couplers", Optics Express, vol. 22, No. 3, (Feb. 10, 2014), p. 3145-3150.
Miller, Are optical transistors the logical next step? Nature Photonics 4, 3 (2010). 3 pages.
Miller, Attojoule optoelectronics for low-energy information processing and communications. Journal of Lightwave Technology 35, 346-396 (2017).
Miller, D. A. B., "Reconfigurable add-drop multiplexer for spatial modes", Optics Express, vol. 21, No. 17, (Aug. 26, 2013), pp. 20220-20229.
Miller, D. A. B., "Self-aligning universal beam coupler", Opt. Express, vol. 21, (Aug. 26, 2013), 6 pages.
Miller, D. A. B., "Perfect optics with imperfect components," Optica 2, pp. 747-750 (2015).
Miller, D. A. B., "Self-configuring universal linear optical component [invited]," Photonics Research 1, URL http://dx.doi.org/10.1364/PRJ.1.000001, 15 pages (2013).

(56) References Cited

OTHER PUBLICATIONS

Miller, Energy consumption in optical modulators for interconnects. Optics Express 20, A293-A308 (2012).
Misra et al., "Artificial neural networks in hardware: A survey of two decades of progress," Neurocomputing 74, pp. 239-255 (2010).
Mohseni, M. et al., "Environment-assisted quantum walks in photosynthetic complexes", The Journal of Chemical Physics 129, (May 18, 2008), 8 pages.
Moore, Cramming more components onto integrated circuits. Electronics 114-117 (1965).
Mower et al., "High-fidelity quantum state evolution in imperfect photonic integrated circuits," Physical Review A, vol. 92, No. 3, p. 032322, 2015. 7 pages.
Mower, J. et al., "Efficient generation of single and entangled photons on a silicon photonic integrated chip", Phys. Rev. A 84, (Oct. 18, 2011), 8 pages.
Nagamatsu et al., A 15-ns 32 32-bit cmos multiplier with an improved parallel structure. In Custom Integrated Circuits Conference, 1989., Proceedings of the IEEE 1989, 10-3 (IEEE, 1989). 4 pages.
Najafi, F. et al., "On-Chip Detection of Entangled Photons by Scalable Integration of Single-Photon Detectors", arXiv:1405.4244 [physics.optics] (May 16, 2014), 27 pages.
Nozaki et al., "Sub-femtojoule all-optical switching using a photonic-crystal nanocavity," Nature Photonics 4, pp. 477-483 (2010).
O'Brien, J. L. et al., "Demonstration of an all-optical quantum controlled-NOT gate", Nature 426, (Feb. 1, 2008), 5 pages.
Onsager, "Crystal Statistics. I. A Two-Dimensional Model with an Order-Disorder Transition," Physical Review, vol. 65, pp. 117-149, Feb. 1944.
Orcutt, J. S. et al., "Nanophotonic integration in state-of-the-art CMOS foundries", Optics Express, vol. 19, No. 3, (2011), pp. 2335-2346.
Pelissetto et al., "Critical phenomena and renormalization-group theory," Physics Reports, vol. 368, pp. 549-727, Oct. 2002.
Peng, Implementation of AlexNet with Tensorflow. https://github.com/ykpengba/AlexNet-A-Practical-Implementation (2018). Accessed Dec. 3, 2018. 2 pages.
Peretto, "Collective properties of neural networks: A statistical physics approach," Biological Cybernetics, vol. 50, pp. 51-62, Feb. 1984.
Pernice, W. et al., "High-speed and high-efficiency travelling wave single-photon detectors embedded in nanophotonic circuits", Nature Communications 3, 1325 (2012), 23 pages.
Peruzzo, A., et al., "Quantum walk of correlated particles", Science 329, (2010), 8 pages.
Politi, A. et al., "Integrated Quantum Photonics", IEEE Journal of Selected Topics in Quantum Electronics, vol. 5, Issue 6, (2009), 12 pages.
Politi, A. et al., "Silica-on-Silicon Waveguide Quantum Circuits", Science 320, (Feb. 1, 2008), 5 pages.
Poon et al., "Neuromorphic silicon neurons and large-scale neural networks: challenges and opportunities," Frontiers in Neuroscience, vol. 5, Article 108, 3 pages (2011).
Prucnal et al., "Recent progress in semiconductor excitable lasers for photonic spike processing," Advances in Optics and Photonics 8, pp. 228-299 (2016).
Psaltis et al., "Holography in artificial neural networks." Landmark Papers on Photorefractive Nonlinear Optics. 1995. 541-546.
Qiao et al., "16×16 non-blocking silicon electro-optic switch based on mach zehnder interferometers," in Optical Fiber Communication Conference, p. Th1C.2, Optical Society of America, 2016. 3 pages.
Ralph, T. C. et al., "Linear optical controlled-NOT gate in the coincidence basis", Phys. Rev. A, vol. 65, (Jun. 20, 2002), p. 062324-1-062324-5.
Ramanitra et al., "Scalable and multi-service passive optical access infrastructure using variable optical splitters." Optical Fiber Communication Conference. Optical Society of America, 2006, 3 pages.
Aaronson, S. et al., "Computational complexity of linear optics", in Proceedings of the 43rd Annual ACM Symposium on Theory of Computing (ACM, New York, NY, USA, 2011), STOC '11, pp. 333-342, ISBN 978-1-4503-0691-1.
Abu-Mostafa et al., "Optical neural computers." Scientific American 256.3 (1987): 88-95.
Albert et al., "Statistical mechanics of com-plex networks," Reviews of Modern Physics, vol. 74, pp. 47-97, Jan. 2002.
Almeida, V. R., et al., "All-optical control of light on a silicon chip", Nature, vol. 431, (Aug. 6, 2004), pp. 1081-1084.
Amir, A. et al., "Classical diffusion of a quantum particle in a noisy environment", Physical Review, E 79, 050105 (Feb. 5, 2009), 5 pages.
Amit et al.,"Spin-glass models of neural networks," Physical Review A, vol. 32, pp. 1007-1018, Aug. 1985.
Anitha et al., Comparative study of high performance brauns multiplier using fpga. IOSR J Electron Commun Eng (IOSRJECE) 1, 33-37 (2012).
Appellant et al., "Information processing using a single dynamical node as complex system," Nature Communications 2, 6 pages (2011).
Arjovsky et al., "Unitary Evolution Recurrent Neural Networks," arXiv:1511.06464, 9 pages (2015).
Aspuru-Guzik A. et al., "Simulated Quantum Computation of Molecular Energies", Science 309, 1704 (2005), 21 pages.
Aspuru-Guzik, A. et al., "Photonic quantum simulators", Nat. Phys., 8, 285 (2012), 29 pages.
Atabaki et al., Integrating photonics with silicon nanoelectronics for the next generation of systems on a chip. Nature 556, 349 (2018). 10 pages.
Baehr-Jones, T. et al., "A 25 GB/s Silicon Photonics Platform", arXiv: 1203.0767 (2012), 11 pages.
Bao et al., "Atomic-Layer Graphene as a Saturable Absorber for Ultrafast Pulsed Lasers," Advanced Functional Materials 19, pp. 3077-3083 (2009).
Bao et al., "Monolayer graphene as a saturable absorber in a mode-locked laser," Nano Research, vol. 4, pp. 297-307, Mar. 2011.
Barahona, "On the computational complexity of Ising spin glass models," Journal of Physics A: Mathematical and General, vol. 15, pp. 3241-3253, Oct. 1982.
Bertsimas et al., "Robust optimization with simulated annealing," Journal of Global Optimization 48, pp. 323-334 (2010).
Bewick, Fast multiplication: algorithms and implementation. Ph.D. thesis, Stanford University (1994). 170 pages.
Bonneau et al., "Quantum interference and manipulation of entanglement in silicon wire waveguide quantum circuits." New Journal of Physics 14.4 (2012): 045003. 13 pages.
Brilliantov, "Effective magnetic Hamiltonian and Ginzburg criterion for fluids," Physical Review E, vol. 58, pp. 2628-2631, Aug. 1998.
Bromberg, Y. et al., "Bloch oscillations of path-entangled photons", Phys. Rev. Lett., vol. 105, (May 18, 2011), 5 pages.
Bromberg, Y. et al., "Quantum and Classical Correlations in Waveguide Lattices", Phys. Rev. Lett. 102, (Jun. 26, 2009), p. 253904-1-253904-4.
Broome, M. A. et al., "Photonic Boson Sampling in a Tunable Circuit", Science 339, 794 (Dec. 20, 2012), 6 pages.
Bruck et al., "On the power of neural networks for solving hard problems," Journal of Complexity, vol. 6, pp. 129-135, Jun. 1990.
Canziani et al., A. Evaluation of neural network architectures for embedded systems. In Circuits and Systems (ISCAS), 2017 IEEE International Symposium on, 1-4 (IEEE, 2017).
Cardenas, J. et al., "Low loss etchless silicon photonic waveguides", Optics Express, vol. 17, No. 6, (Mar. 16, 2009), pp. 4752-4757.
Carolan et al., "Universal linear optics," Science, vol. 349, pp. 711-716, Aug. 2015.
Caves, Quantum-mechanical noise in an interferometer. Physical Review D 23, 1693 (1981). 16 pages.
Centeno et al., "Optical bistability in finite-size nonlinear bidimensional photonic crystals doped by a microcavity," Phys. Rev., vol. 62, No. 12, pp. R7683-R7686 (2000).
Chan, "Optical flow switching networks," Proceedings of the IEEE, vol. 100, No. 5, pp. 1079-1091, 2012.

(56) References Cited

OTHER PUBLICATIONS

Chen et al., DianNao: A small-footprint high-throughput accelerator for ubiquitous machine-learning. ACM Sigplan Notices 49, 269-284 (2014).
Chen, J. et al., "Efficient photon pair sources based on silicon-on-insulator microresonators", SPIE, vol. 7815, (2010), 9 pages.
Chen, J. et al., "Frequency-bin entangled comb of photon pairs from a Silicon-on-insulator micro-resonator", Optics Express, vol. 19, No. 2, (Jan. 17, 2011), pp. 1470-1483.
Chen, L. et al., "Compact, low-loss and low-power 8×8 braodband silicon optical switch," Optics Express 20(17), 18977-18985 (2012).
Chen, Q. et al., "A Universal method for constructing N-port non-blocking optical router based on 2×2 optical switch", Optics Express 22, 12614 (Aug. 25-28, 2014), p. 357-361.
Cheng et al., "In-Plane Optical Absorption and Free Carrier Absorption in Graphene-on-Silicon Waveguides," IEEE Journal of Selected Topics in Quantum Electronics, vol. 20, pp. 43-48, Jan. 2014.
Chetlur et al., cuDNN: Efficient primitives for deep learning. arXiv preprint arXiv:1410.0759 (2014). 9 pages.
Childs, A. et al., "Spatial search by quantum walk", Physical Review A, 70 (2), 022314 (Aug. 25, 2004), 12 pages.
Chung et al., A monolithically integrated large-scale optical phased array in silicon-on-insulator cmos. IEEE Journal of Solid-State Circuits 53, 275-296 (2018).
Cincotti, "Prospects on planar quantum computing." Journal of Lightwave Technology 27.24 (2009): 5755-5766.
Clements et al., "Optimal design for universal multiport interferometers," Optica, vol. 3, p. 1460, Dec. 2016. 6 pages.
Crespi, A. et al., "Integrated multimode interferometers with arbitrary designs for photonic boson sampling", Nat Photon 7, (May 26, 2013), p. 545-549.
Crespi, et al., "Anderson localization of entangled photons in an integrated quantum walk", Nat Photon 7, 322 (Apr. 3, 2013), 7 pages.
Dai, D. et al., "Novel concept for ultracompact polarization splitter-rotator based on silicon nanowires", Optics Express, vol. 19, No. 11, (May 23, 2011), pp. 10940-10949.
Di Giuseppe, G. et al., "Einstein-Podolsky-Rosen Spatial Entanglement in Ordered and Anderson Photonic Lattices", Phys. Rev. Lett. 110, (Apr. 12, 2013), p. 150503-1-150503-5.
Dunningham et al., "Efficient comparison of path-lengths using Fourier multiport devices." Journal of Physics B: Atomic, Molecular and Optical Physics 39.7 (2006): 1579. 9 pages.
E. Ising, "Beitrag zur Theorie des Ferromagnetismus," Z. Phys., 1925. 6 pages.
Esser et al., "Convolutional networks for fast, energy-efficient neuromorphic computing," Proceedings of the National Academy of Sciences 113, 11,441-11,446 (2016).
Farht et al., "Optical implementation of the Hopfield model," Applied Optics, vol. 24, p. 1469, May 1985. 7 pages.
Feinberg et al., Making memristive neural network accelerators reliable. In 2018 IEEE International Symposium on High Performance Computer Architecture (HPCA), 52-65 (IEEE, 2018).
Lin et al., "All-Optical Machine Learning Using Diffractive Deep Neural Networks," Apr. 2018. 20 pages.
Reck et al., "Experimental realization of any discrete unitary operator," Phys. Rev. Lett. 73, 58-61 (1994).
International Search Report and Written Opinion in International Patent Application No. PCT/US2019/016752 dated Jan. 17, 2020, 12 pages.

* cited by examiner

SERIALIZED ELECTRO-OPTIC NEURAL NETWORK USING OPTICAL WEIGHTS ENCODING

CROSS-REFERENCE TO RELATED APPLICATION(S)

This application claims the priority benefit, under 35 U.S.C. 119(e), of U.S. Application No. 62/626,902, filed on Feb. 6, 2018, and entitled "Serialized Electro-Optic Neural Network Using Optical Weights Encoding," which is incorporated herein by reference in its entirety.

GOVERNMENT SUPPORT

This invention was made with Government support under Grant. Nos FA9550-14-1-0052, FA9550-13-1-0193, and FA9550-16-1-0391 awarded by the Air Force Office of Scientific Research. The Government has certain rights in the invention.

BACKGROUND

A conventional neural network usually performs computations by taking a linear transformation of an array of input signals. In this linear transformation, each signal in the array is multiplied by a weight and then these weighted signals are added together. In an electronic neural network, these weights are typically stored in memory. Each time the neural network performs a calculation, the processor retrieves the stored weights from the memory and use these weights to adjust the settings of the neural network. The power consumption and communication bandwidth associated with retrieving and applying the weights can increase as a function of $N^2$, where N is the number of neurons per layer in the neural network. Therefore, as the number of nodes N increases, it can be challenging for a neural network on a traditional computer to provide sufficient power and communication bandwidth.

SUMMARY

The power and bandwidth problems that affect neural networks on traditional computer networks by implementing an optical neural network. This optical neural network can be accomplished with an apparatus that includes a first layer of neurons, a second layer of neurons, and an optical weight transmitter in optical communication with the second layer of neurons. In operation, the first layer of neurons emits a first array of data signals $x_j$ at a first optical frequency, where $j=1, 2, \ldots N$, and N is a positive integer. Each neuron in the second layer of neurons calculates a weighted average $y_i$ of the first array of data signals, where $y_i=\text{sum}(w_{ij}x_j)$, $w_{ij}$ is a weight, $i=1, 2 \ldots M$, and M is a positive integer. And the optical weight transmitter transmits an array of weight signals at a second optical frequency towards the second layer for calculating the weighted average $y_i$, where the weight signals represent the weight $w_{ij}$.

Each neuron in the second layer may include a homodyne receiver and an integrator. The homodyne receiver is operably coupled to the first layer and the optical encoding transmitter and generates a weighted product between each data signal in the first array of data signals and a corresponding weight signal in the array of weight signals. And the integrator, which is operably coupled to the homodyne receiver and may include an RC filter or an integrating operational amplifier, calculates the weighted average $y_i$ from the weighted products. Each neuron may include a nonlinear function unit to generate an output $z_i$ from the weighted average)), and a neuron transmitter to transmit the output $z_i$ to a third layer in the optical neural network.

Alternatively, each neuron in the second layer may include a first detector, a second detector, and a processor. The first detector detects a data signal in the first array of data signals. The second detector detects a corresponding weight signal in the array of weight signals. And the processor, which is operably coupled to the first detector and the second detector, computes the weighted product between the data signal and the corresponding weight signal.

The second optical frequency may be greater than the first optical frequency by at least about $2\pi\times 20$ GHz. The optical encoding transmitter may include an array of grating couplers. Each neuron in the first layer may be able to transmit a copy of the first array of data signals $x_i$ in a serial manner toward every neuron in the second layer.

The first layer of neurons and the second layer of neurons may be in a first optical neural network, and the apparatus may include or implement a second optical neural network that is in optical communication with the optical weight transmitter. In this case, the optical weight transmitter provides the array of weight signals to the second optical neural network, which computes a product of another array of data signals with the array of weight signals.

Similarly, an optical processing system may include a plurality of optical neural networks and an optical weight transmitter in optical communication with the plurality of optical neural networks. In operation, the optical weight transmitter transmits an array of weight signals to each optical neural network in the plurality of optical neural networks. Each optical neural network in the plurality of optical neural networks may calculate a weighted average of a corresponding array of input signals and the array of weight signals. The optical weight transmitter can be integrated in a photonic integrated circuit and can include a grating coupler to couple the array of weight signals to the plurality of optical neural networks.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1A:
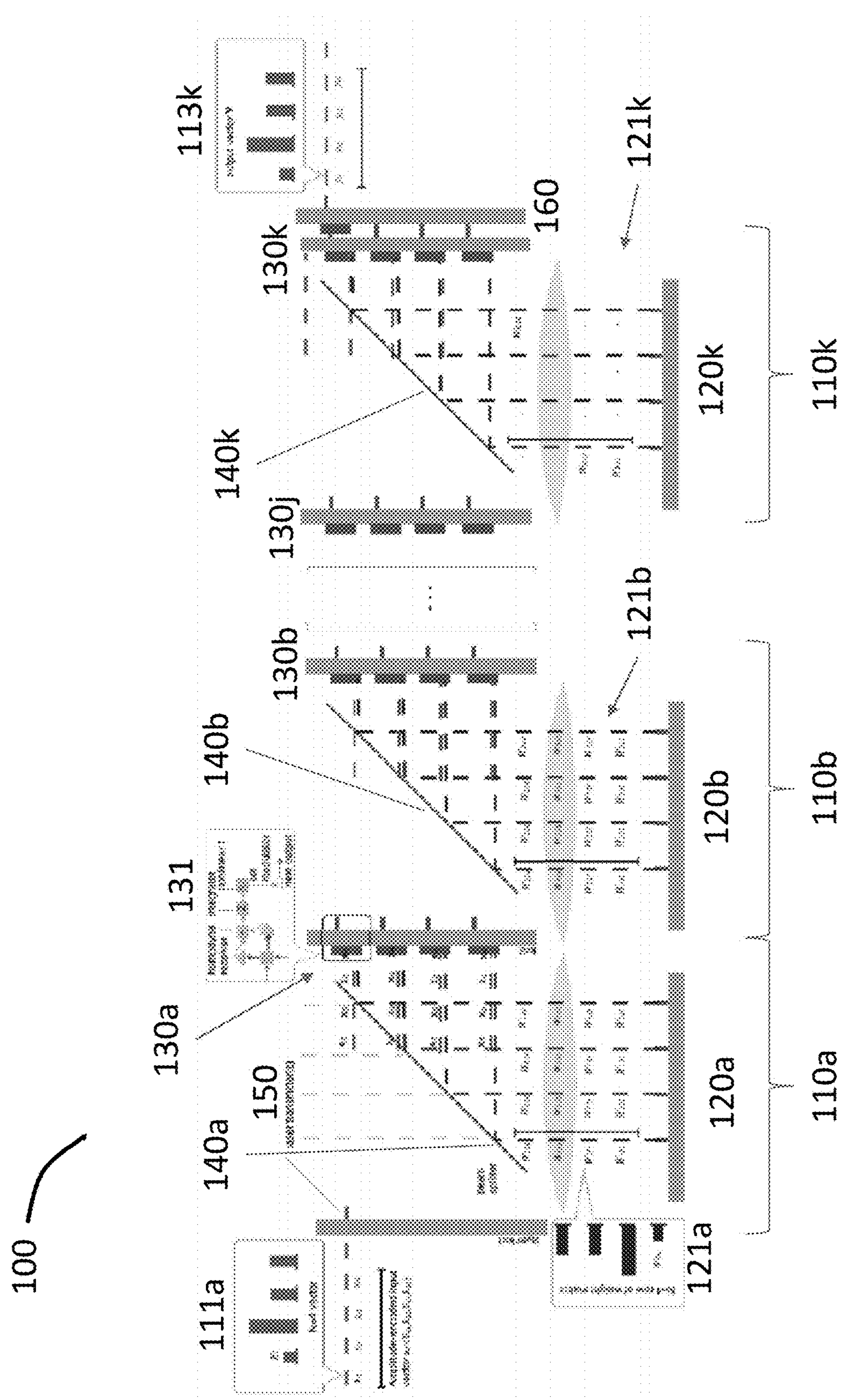
FIG. 1A shows a schematic of a multi-layer optical neural network using optical weight encoding.

Apparatus, systems, and methods described herein employ optical weight encoding for a neural network to perform learning and inference at energy consumptions that are orders of magnitude lower than those of conventional electronic neural networks, such as those using graphical processing units (GPUs). The weights of the neural network that determine the matrix transformations of input signals between neuron layers are encoded optically, in contrast to hardware-encoded implementations in an electronic neural work. The optically encoded weight transformation can be easily reprogrammed and can be particularly advantageous in data centers. In these data centers, a central transmitter can encode or modulate the weights into optical beams, which are subsequently divided and distributed (e.g., using beam splitters) across a large number of neural network inference processors, thereby reproducing the weights without retrieving the weights for each calculation.

Optical Encoding for Neural Networks

In this optical encoding, $X_i$ is the ith data vector entering the neural network. It can be a 1×N row matrix including N amplitudes $E_{ij}$, j=1, 2 . . . N, where each amplitude is encoded in $2^d$ levels, i.e., each amplitude stores d bits of information. $Y_i$ is the ith data output vector from the neural network, i.e., the neural network performs the function $Y_i$=NN($X_i$), Δt is the duration of each time bin in which the input vector $X_i$ is encoded. M is the number of layers in the neural network. In practice, the number of layers M can be greater than 2 (e.g., 2 layers, 3 layers, 5 layers, 10 layers, 15 layers, 20 layers, 25 layers, 30 layers, 40 layers, 50 layers, or more, including any values and sub ranges in between).

In this neural network, $W_k$ is the kth weight matrix, including elements $w_{klm}$, where l, m=1, 2 . . . N and k=1, 2 . . . M. At each layer (e.g., kth layer), $W_k$ is a two-dimensional (2D) matrix. Data representing these weights are encoded into the amplitudes $Ew_{klm}$ of optical signals (also referred to as weight signals). In other words, by detecting the amplitudes of the weight signals, one can estimate the corresponding weight value $Ew_{klm}$.

In addition, $\omega_s$ is the carrier frequency of the input data (x); $\omega_w$ is the carrier frequency of the weight signals. For optical fields in the telecom band, $\omega_s$ can be, for example, about 2π×200 THz. In some cases, $\omega_w$ can be greater than $\omega_s$. For example, the difference between these frequencies can be Δω~2π×20 GHz. In this case, the detectors in the neurons detect a beat note at the difference frequency whose envelope is modulated with the product of the weight and the data signal.

Calculating Products

For each transformation performed by the neural network, the data entry $x_{ij}$ is first multiplied by the weight $w_{jlm}$, i.e. producing a product. The product between data entry $x_{ij}$ and weight $w_{jlm}$ can be obtained by colliding the corresponding data field amplitudes $E_{ij}$ with the weight field amplitudes $Ew_{klm}$ onto a homodyne receiver. The homodyne receiver includes a beam splitter followed by two photodetectors. Subtracting the intensities from the two detectors can recover $|E_{ij}||Ew_{klm}|$, which is the product used for the transformation.

Calculating Weighted Averages at Each Neuron

After calculating each product between the data entry and the corresponding weight at each neuron, the neural network then adds these products together to calculate weighted averages at each neuron. An electronic integrator following each homodyne detector sums the products of data entries and the weights. For example, the electronic integrator can include an RC filter. In another example, the integrator can include an integrating operational amplifier (Op-Amp). This produces the weighted average Sum ($|E_{il}||Ew_{klm}|$), l=1, 2 . . . N, on neuron m. The process of obtaining the matrix-vector process can be ultrafast, since it relies on the near-instantaneous processes of photogenerated carrier generation and carrier accumulation.

Nonlinear Function

The weighted average in the neural network is then passed through a nonlinear electronic function ƒ For example, the function can be a threshold function. In another example, the nonlinear function can be a sigmoidal function. The nonlinear function produces the output ƒ(Sum[$|Eij||Ew_{jlm}|$, j=1, 2 . . . N]), which is stored until translated into an optical signal, as detailed below.

A Neural Network Using Optical Weight Encoding

Figure 1B:
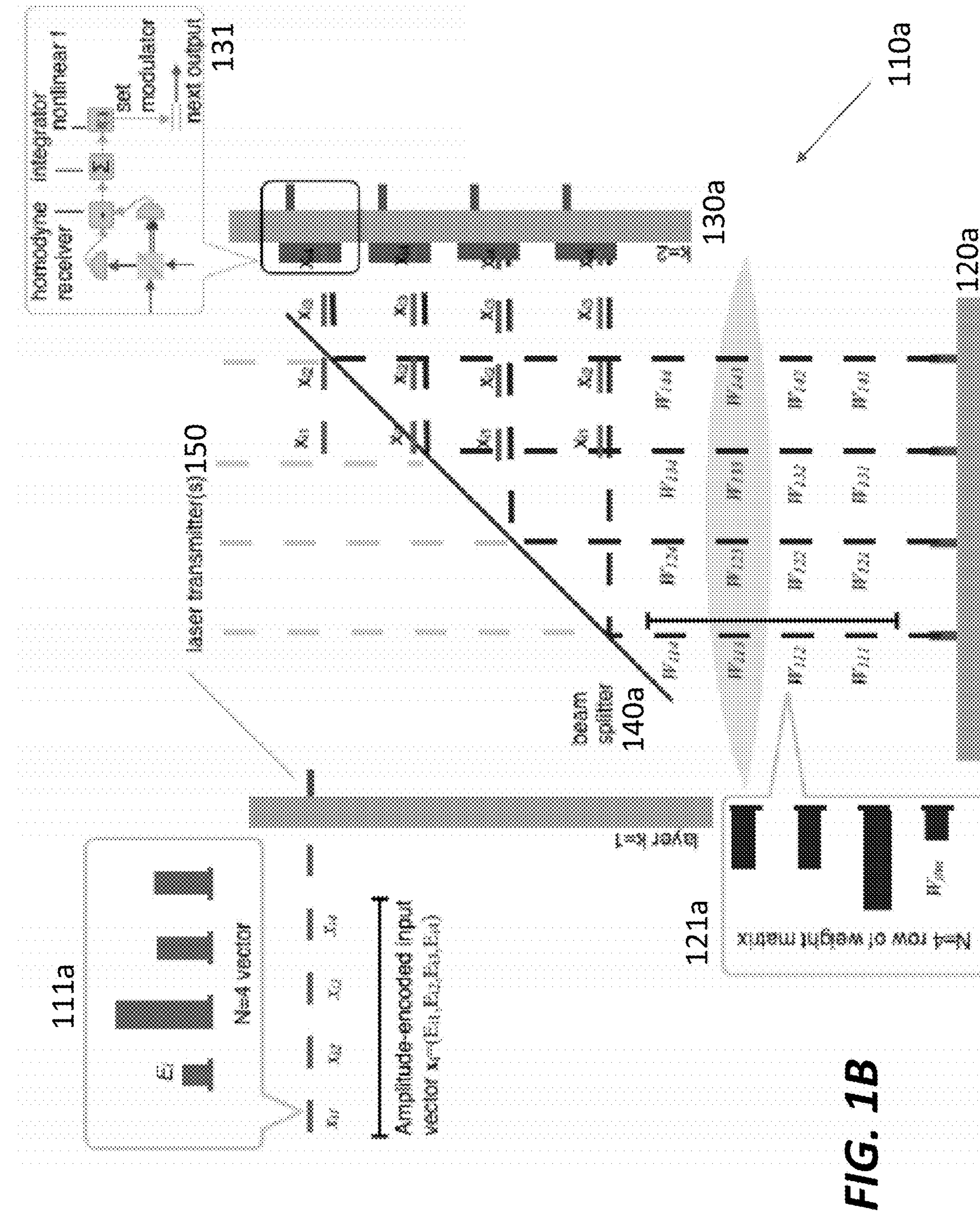
FIG. 1B shows a close-up of the first layer of the multi-layer optical neural network of FIG. 1A.
Figure 1C:
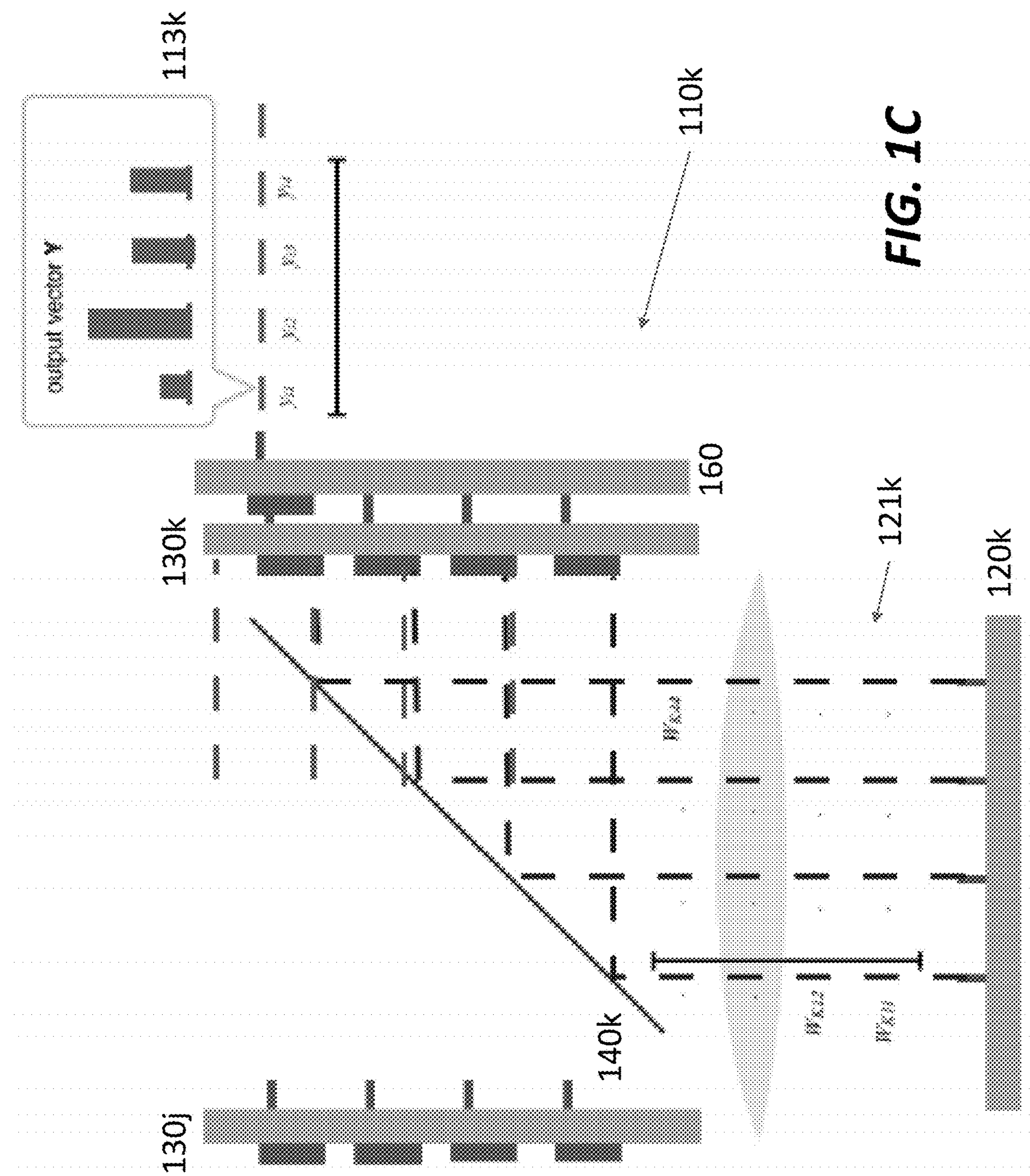
FIG. 1C shows a close-up of the last layer of the multi-layer optical neural network of FIG. 1A.

FIGS. 1A-1C show different views of an optical neural network 100 using optical weight encoding. The neural network 100 includes a series of cascaded layers 110*a*-110*k* (collectively, layers 110). FIG. 1A shows three layers 110, including an input layer 110*a* also shown in FIG. 1B and an output layer 110*k* also shown in FIG. 1C. In practice, the optical neural network 100 can have more layers or fewer layers. Except for the input layer 110*a*, the input to each layer 110 is the output from the preceding layer 110. And except for the output layer 110*k*, the output from each layer 110 is the input to the succeeding layer 110.

Each layer 110 includes a corresponding beam splitter 140*a*-140*k* with two inputs and at least one output, which is coupled to a corresponding neuron array 130. Each neuron array 130 in FIGS. 1A-1C has four neurons 131, one of which is shown in greater detail in FIG. 1D (described below). In practice, there can be any number of neurons 131 in each layer 110. The neurons.

The beam splitter's first input is optically coupled to a corresponding array of optical weight transmitters 120*a*-120*k*. If the neural network 100 is one of several identical neural networks running in parallel on the same chip or on coupled chips, it may receive some or all of the weights from a set of weight transmitters shared by all of the neural networks. This reduces power consumption as explained in greater detail below.

The beam splitter's second input is connected to the neuron array 130 in the preceding layer or laser transmitters 150 in the case of the input layer 110*a*. The optical weight transmitters 120 emit optical weights 121*a*-121*k*, which are encoded serially on optical carriers and combined with optical input signals 111*a*-111*k* entering the beam splitter's second input. The resulting signals are detected by the neurons 131 in the neuron array 130 at the beam splitter's output.

FIG. 1B shows the input signals 111*a* and weights 121*a* in the input layer 110*a* more clearly. The input signals 111*a* and weights 121*a* are aligned spatially and modulated serially, e.g., with digital pulses that are timed to overlap temporally and spatially at a corresponding neuron 131. FIG. 1C shows similar overlap in the output layer 110*k*.

Figure 1D:
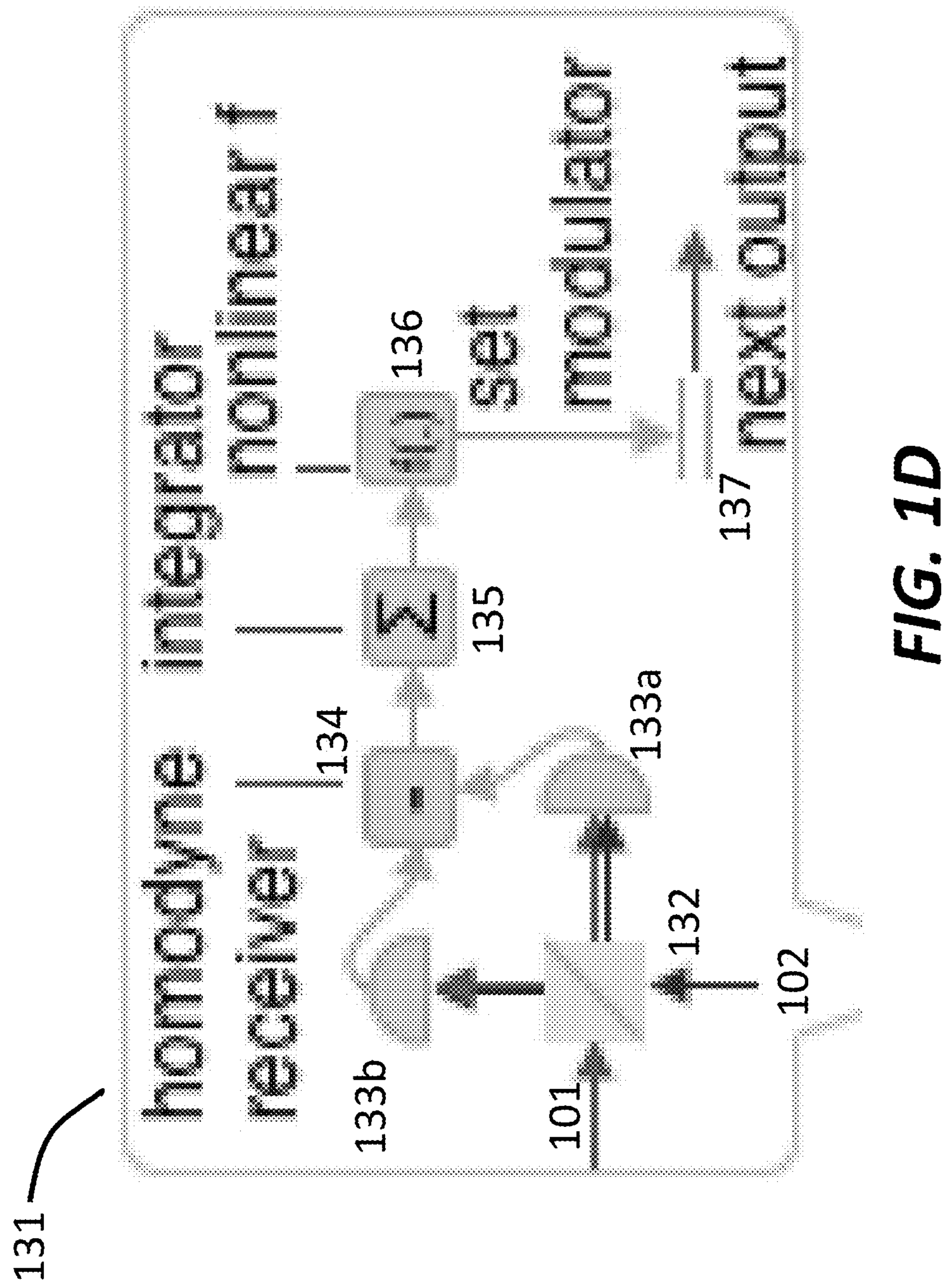
FIG. 1D shows a schematic of a neuron that can be used in the optical neural network using optical weight encoding shown in FIG. 1A.

FIG. 1D shows a schematic of a neuron 131 in the neural network 100 shown FIG. 1A. The neurons 130 in the neural network include an optical combiner 132 to combine data signals 101 and weight signals 102, followed by two detectors 133*a* and 133*b*. A homodyne receiver 134 is connected to the two detectors 133*a* and 133*b* and an integrator 135, such as an RC filter or an integrating operational amplifier, is connected to the homodyne receiver 134 to calculate weighted averages of the data signals. The weighted averages are then transformed through a nonlinear function block 136 to generate an output, which is then transmitted to the next neuron by a transmitter 137. The transmitter 137 can be implemented as a laser that is modulated directly by the nonlinear function block 136 or as a laser that drives an external modulator modulated by the nonlinear function block 136.

Figure 1E:
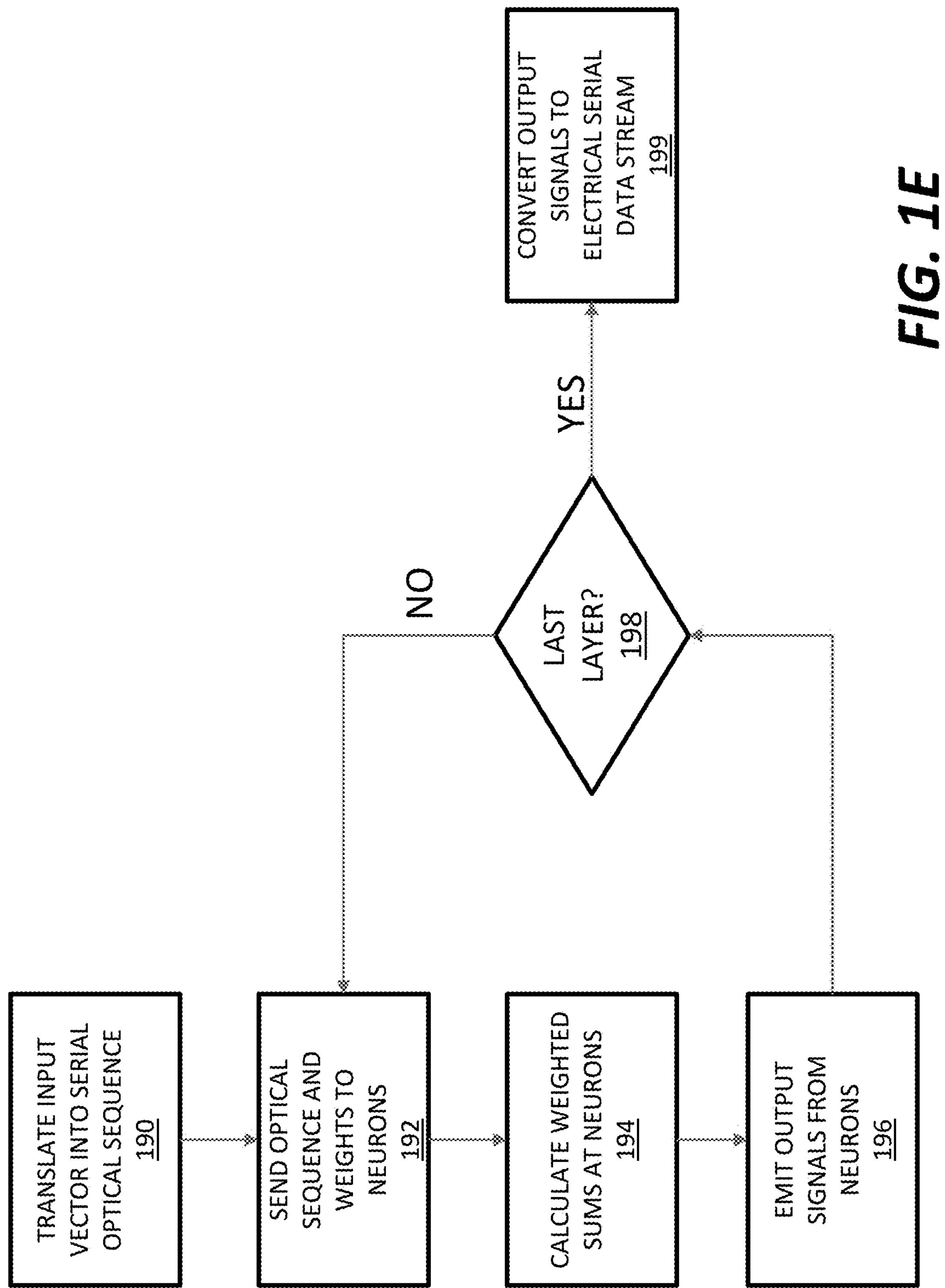
FIG. 1E is a flow chart illustrating operation of the optical neural network of FIG. 1A.

FIG. 1E illustrates a process 190 for operating the neural network 100 shown in FIG. 1A. In step 190, the input vector $X_i$ is translated into a serial optical sequence of optical amplitudes $E_{ij}$, where j=1, 2 . . . N. In FIGS. 1A-1C, j=1, 2, 3, and 4.

These optical amplitudes $E_{ij}$ are sent to N neurons in step 192. At the same, the optical weight transmitters 120 transmit weight signals to the N neurons as illustrated in FIGS. 1A-1D. The neurons calculate the weighted averages of electronic data signals emitted from each layer 110 at the homodyne receivers 134. In step 194, each neuron calculates the sum of inputs in $x_i$, weighted by $W_k$, where k=1 for the first layer. This sum can be done optically, as in the homodyne receiver neuron 131 of FIG. 1D, or in the optical and electronic domains as explained below.

The transmitters in layer k=2 send their signals towards the next layer (here, layer 3) in step 196. The transmitter in each neuron transmits equally to the receivers in the subsequent (k=3) layer. The transmissions can occur in sequence: on the first clock cycle, neuron 1 of layer 2 emits to all neurons of layer 3. On the next clock cycle, neuron 2 emits to all neurons in layer 3. This process continues until all neurons in layer 2 have transmitted to layer 3. Each of these transmissions from layer 2 are again weighted by optical signals $Ew_{lkm}$ in the next layer of neurons (k=3).

The process repeats up to the last layer 110*k* (k=M in subscript notation) (step 198). This last layer derives the final output vector $y_{ij}$, with j=1, 2 . . . . N, as shown in FIG. 1C. This output vector can be re-converted into an electrical serial data stream in step 199. The output vectors can be converted into electrical data using routing wires to each of the neurons or by having each neuron transmit its data to a central aggregator photodetector 160 as shown in FIG. 1D. In this approach, the first neuron in layer 110*k* transmits its signal to the aggregator photodetector 160, which immediately transfers the received signal as a digital serial data stream 113*k* through an analog-to-digital converter (not shown). Then the second neuron in the last layer 110*k* transmits its signal to the aggregator detector 160, and so on in a serial fashion until all the of neurons have transmitted output to the aggregator detector 160. Accordingly, this process can produce a digital data stream that represents the neural network output matching the input data stream rate.

Analog-to-digital (A/D) conversion can be a useful component for a neural network where the input and output are digital, but which internally works on analog encoding. There are several ways to simplify A/D conversion in this optical implementation. Suppose that the serialized input includes 4-bit numbers (a relatively low-bit encoding for illustration) $x_4$, $x_3$, $x_2$, $x_1$, where $x_k$=0, 1. This can be encoded into an analog signal on the first encoding step (e.g., step 190 in FIG. 1E) in which the electrical signal is imprinted on the optical carrier. The binary electrical signal is fed into an integrating amplifier with increasing gain, where the gain is proportional to $2^{k-1}$ for $x_k$. This produces a signal of $X=8x_4+4x_3+2x_2+x_1$. This signal can be converted such that, considering the response of the modulator, it encodes a transmitted field with amplitude X*c, where c is a constant.

Chip-Based Implementation

Figure 2:
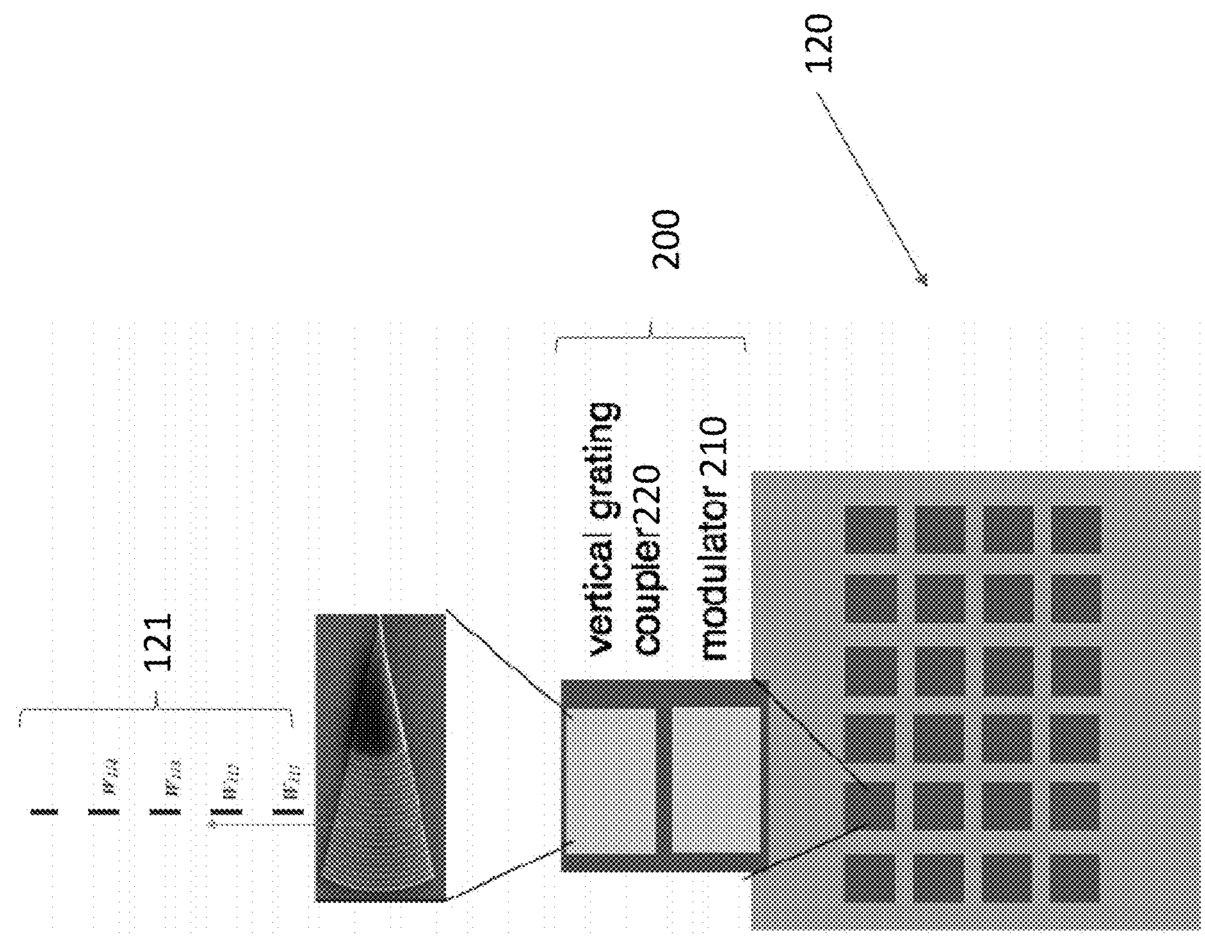
FIG. 2 shows a schematic of a transmitter that can be used for optical weight encoding.

FIG. 2 shows an optical weight transmitter array 120 in greater detail. This transmitter array 120 is implemented using a photonic integrated circuits (PIC) and includes individual transmitters 200 arranged on a square lattice. Each transmitter 200 includes a modulator 210, such as a directly modulated semiconductor laser or a laser coupled to an external modulator, that emits an optical carrier modulated with the optical weights (the optical weights 121). A vertical grating coupler 220 couples the optical weights 121 out of the plane of the modulator 210, e.g., to a beam splitter 140 implemented on a different layer of the PIC, on a different PIC, or as a bulk optical component. As discussed below, a single optical weight transmitter array 120 can supply the same optical weights 121 to many different neural networks at the same time, which reduces power consumption per neural network by a factor equal to the number of neural networks.

Each of these neural networks can be implemented on the same PIC or on a different PIC or combination of PICs with vertical grating couplers to distribute the optical weights and other optical signals among PICs. In these implementations, the neuron arrays are implemented in the PIC(s), with grating couplers on the receiving side to couple incoming light from the optical weight transmitter array(s) 120 into on-chip waveguides, which guide the light to an on-chip homodyne detector as in FIG. 1D. The photocurrent from this homodyne detector is processed electronically as described above and is used to re-encode an optical carrier to emit into the forward direction toward the next layer in the neural network.

The grating couplers used to couple light into and out of the PICs can be directional. For example, one type of grating coupler couples light through the top of the PIC, and another type couples light through the bottom of the PIC. These two types of vertical grating couplers can be employed to receive and transmit signals on each of the neuron layers, e.g., in stack of PICs used to implement different layers of the neural network.

In the neural network described herein, it can be helpful for each layer to uniformly distribute the data signals in a free-space implementation, e.g., using a series of beam displacers can be used. More information about beam displacers can be found in P. Xue et al., "Observation of quasiperiodic dynamics in a one-dimensional quantum walk of single photons in space," New J. Phys. 16 053009 (6 May 2014), which is hereby incorporated by reference in its entirety. In another example, the entire circuit can be implemented on one or a series of PICs. The PICs in this case can include cascaded and offset Mach Zehnder interferometers to spread light from one layer uniformly into all other layers.

Power Consumption in Neural Network Using Optical Weight Encoding

The entire set of weights in the neural network can be continuously streamed to the neurons. Effectively, the neural network "program/connectivity" is encoded into a large number of optical data streams. This can result in significant power savings, especially when the same data streams are applied across many copies of neural networks. It is common to run many instances of a neural network in parallel. For example, data centers by Google, Apple, Microsoft, and Amazon run very large numbers of instances of speech recognition simultaneously. Each of these instances uses the same "program" or weights $W_j$. In an electronic neural network, each of the weights is recalled from memory for each running of the neural network on each instance. In contrast, an optical neural network allows a data center to encode the weights into optical intensities just once, and then to copy these weights using beam splitters and route them to many optical neural network processors. This amortizes the energy cost of encoding the weights as the number of neural network instances grows larger. Other energy costs are those related to the optical energy in each time step of the neural network processor, plus those in the detectors, integrators, and modulators.

Energy Consumption in Neural Network Using Optical Weight Encoding

Suppose that the optical neural network operates at 10 GHz modulation rate (a reasonable assumption for high-speed modulators and photodetectors like those in the neural network 100 of FIG. 1A). For each time step, the neural network computes N×M products, corresponding to $R \sim 10^{10} \times N \times M$ floating point operations. The energy consumption per time step include the following contributions:

1) Encoding one component of vector x at every layer, which in a chip-integrated ring modulator consumes $U_{mod}$. A typical number for $U_{mod}$ can be about 10 fJ (a range of about 0.1 fJ to about 1 pJ depending on the modulator). Therefore, the total energy consumption of this contribution is about $U_{mod} \times M$.
2) Encoding N×M weights per time step consumes about $U_{mod} \times M \times N$. However, if this "program" is distributed among many processors, as mentioned above, the energy cost in modulation can be distributed across $N_p$ processors, so the energy consumption per processor is about $U_{mod} \times M \times N/N_p$.
3) Energy per optical impulse (whether input field or weight) is $U_{opt}$. U is ultimately lower-bounded by the photon number used for a given bit rate. For example, a photon number of about $10^5$ photons/pulse can be used to ensure encoding about 10 bits with low enough bit error rate. Assuming telecom photons are used, this corresponds to $U_{opt}$ at about $10^{-14}$ Joules. Summing over all pulses yields $N \times M \times U_{opt}$.
4) Photodetector energy of $N \times M \times U_{pd}$, where $U_{pd}$ is about 10 fJ.

Summing these four types of contributions, the energy per time step P is about $M \times (U_{mod} \times (1+N/N_p)+N \times U_{opt}+N \times U_{pd})$. This yields a FLOPs (floating point operations) per second-to-power ratio of $R/P=N/(U_{mod}(1+N/Np)+N \times U_{opt}+N \times U_{pd})$. For $N_p$ at about 1000, N at about 1000, the resulting R/P tends to be about $1/(U_{opt}+U_{pd})$, which is about $5 \times 10^{13}$ FLOPs/Joule, or P/R at about 20 fJ/FLOP. By comparison, modern digital electronic architectures (e.g., graphical processing units/GPUs) can only achieve P/R at about 100 pJ per FLOP. Therefore, the optical neural network described herein can be nearly four orders of magnitude more energy efficient than digital electronic implementations.

Optical Neural Networks Using Photonic Integrated Circuit

As mentioned above, the entire circuit (e.g., similar to the one shown in FIG. 1A) can be implemented on one or a series of photonic integrated circuits (PICs). The PICs can include cascaded and off-set Mach Zehnder interferometers to spread light from one layer uniformly into all other layers.

The PICs allow on-chip implementations of neural networks. For instance, small processing units are distributed across an integrated circuit. These processing units can use digital or analog encoding, and each processing unit represents a neuron. Each neuron can communicate to all other neurons in the neural network by fan-out via an optical 2D waveguide that distributes light across the PIC or electrically through a mesh of wires that connects all neurons to all other neurons. The weights can be encoded in memory that is placed directly above the neurons and are sent into the neurons using electrical or optical connections. In this manner, the entire neural network system is integrated into one chip.

In the on-chip implementation, each neuron can broadcast an optical signal to all of the other neurons or to at least a subset of neurons depending on the neural network process.

In some examples, instead of using interference for products as in the neuron of FIG. 1D, the neuron can calculate the product between weights and signals in the electronic domain. The optical neuron can include two photodetectors, where one photodetector is configured to receive the optical signal and the other photodetector is configured to receive the weight signal. The product of the optical signal and the weight signal can be obtained by multiplying the photodetector outputs electrically. For example, the electrical multiplication can be realized by using the weight as the gain of the signal amplifier. The product operation can thus be carried out in the analog space, or alternatively in the digital domain by first digitizing the signal and weights.

Removing Weight Bottlenecks in Digital Neural Networks

Figure 3:
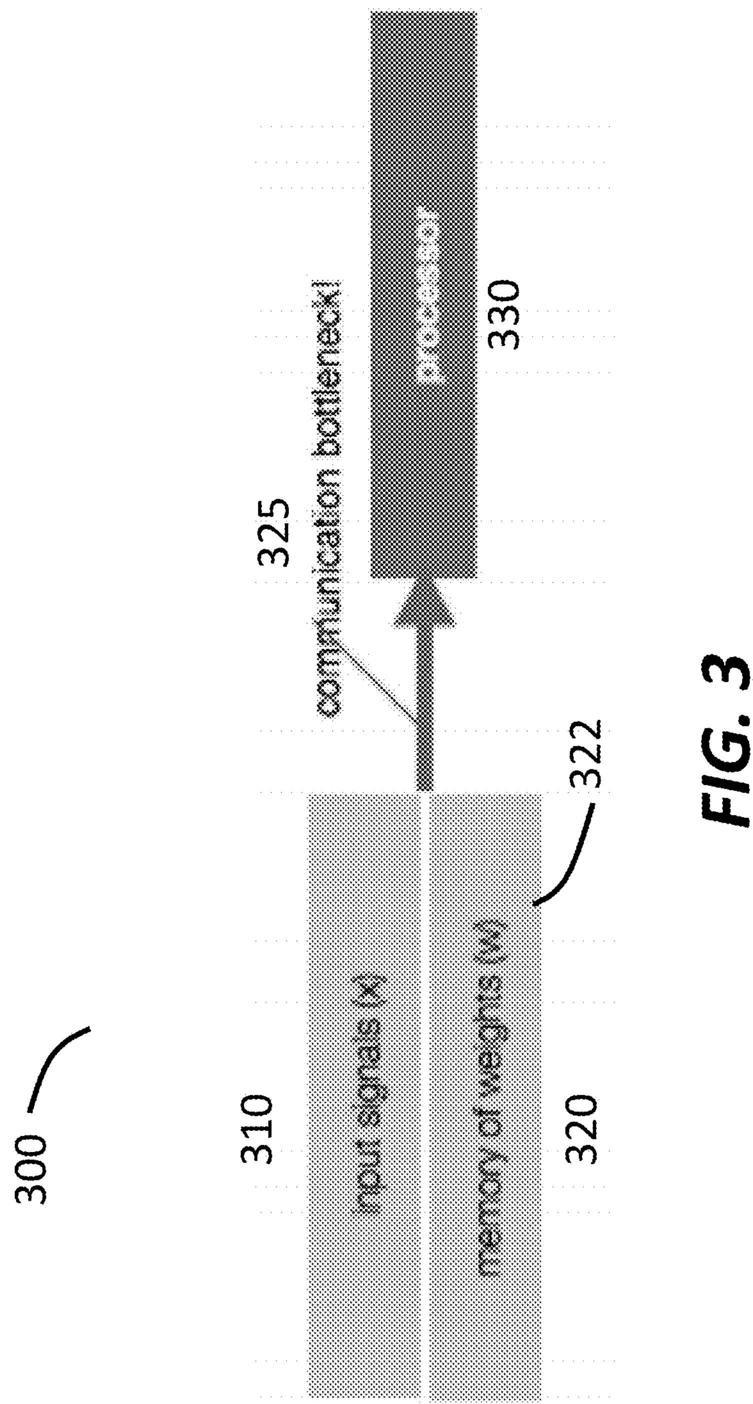
FIG. 3 shows a schematic of a conventional approach to transmit data signals and weight signals with a communications bottleneck for communications with the processor.
Figure 4:
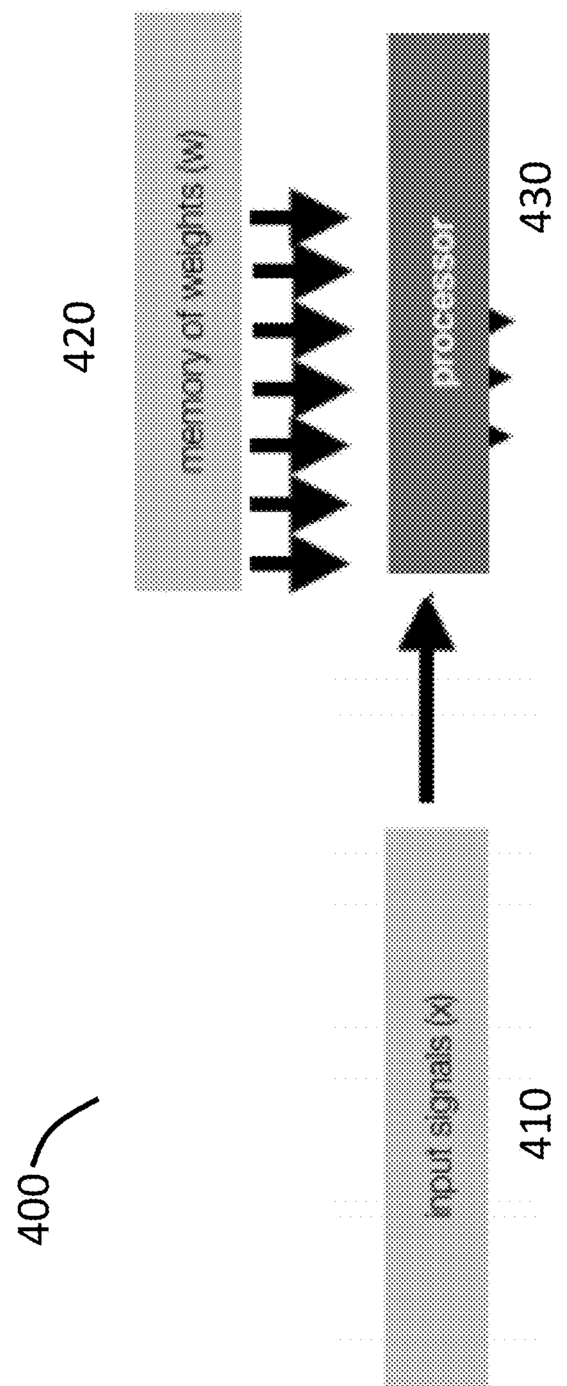
FIG. 4 shows a schematic of a system that can address communication bottleneck in conventional approaches.
Figure 5:
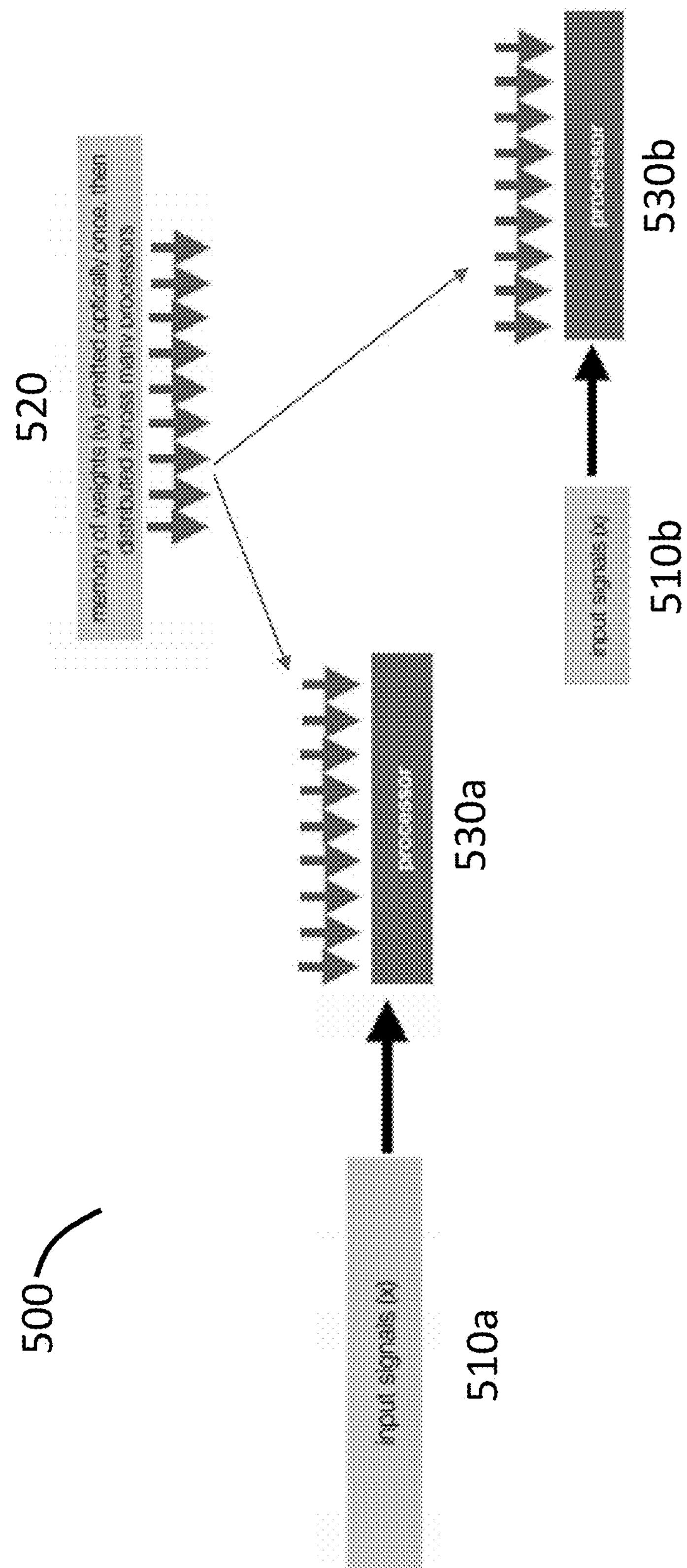
FIG. 5 shows a schematic of a system using optical encoding to address the communication bottleneck in conventional approaches.

In some examples, all signals remain digital in the neural network. Optical signals are used for all of the communication, as illustrated in FIGS. 3-5. FIG. 3 shows a schematic of a conventional approach 300 to transmit data signals and weight signals. In this approach 300, weight signals 320 are stored in memory 322 and sent to a neural network processor 330 via a communication channel 335. Data signals 310 can also be transmitted to the neural network processor 330 via the communication channel 330. As the size of the neural network processor 330 increases, it can be challenging for the communication channel 335 to accommodate the data traffic, creating a communication bottleneck 325.

FIG. 4 shows a schematic of a system 400 that can partially address the communication bottleneck 325 in the conventional approach 300 of FIG. 3. In this system 400, weights are stored in a memory 420 that is close to a neural network processor 430, and the data signals 410 are transmitted to the neural network processor 430 optically. The shortened distance between the memory 420 and the processor 430 can increase the data transmission capacity and result in a compact architecture. However, the energy per memory access is still on the order of a pJ/bit. In addition, the memory 420 usually has a limited size, thereby limiting the size and flexibility of reprogramming of the neural network.

FIG. 5 shows a schematic of a system 500 using optical encoding to address the communication bottleneck. In the system 500, weights are stored in memory 520 and are encoded in optical signals that can be broadcast to multiple processors 530*a* and 530*b* (collectively, processors 530), which also receive data signals 510*a* or 510*b*, respectively. Two processors 530*a* and 530*b* are illustrated in FIG. 5. In practice, any other number of processors can be used (e.g., 5 processors, 10 processors, 20 processors, 50 processors, 100 processors, 200 processors, 500 processors, 1000 processors, or more, including any values and sub ranges in between).

These processors 530 may be optical neural networks like the one shown in FIGS. 1A-1C and can be implemented on the same PIC or on different PICs. Likewise, the memory 520 can be on the same PIC as the processors 530 or on a different PIC. In either case, the memory 520 can be coupled to one or more transmitter arrays 120 like those in FIGS. 1A-1C and 2 for modulating optical weight signals with the stored weights. The optical weight signals may be routed within a given PIC using waveguides and beam splitters and between PICs using waveguides, beam splitters, and grating couplers as described above with respect to FIG. 2.

In this system 500, the same set of weights is distributed optically across a large number of processors, so that the energy per memory weight retrieval is significantly reduced. In some examples, the energy per weight retrieval can be about 1 fJ/bit, which is only 0.1% of the energy for weight retrieval in existing systems (i.e. a 1000-fold savings). In addition, the system 500 can operate without complex and expensive memory next to processors. The immediate and low-power broadcast of weights to possibly thousands of processors can also greatly accelerate learning during operation.

Figures 6A, 6B:
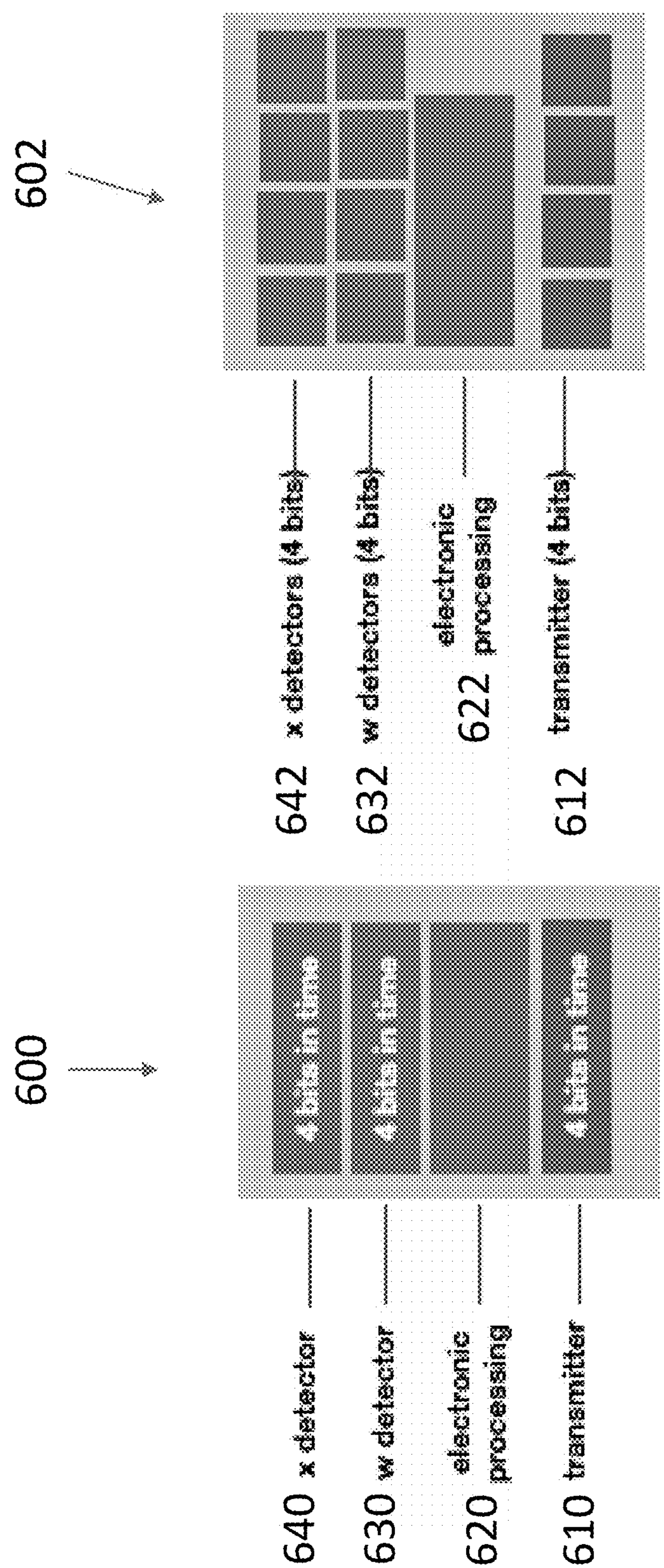
FIG. 6A shows a neuron with separate signal and weight detectors that detect serial bit streams for multiplication in the electronic domain.
FIG. 6B shows a neuron with separate multi-element signal and weight detectors that detect parallel bit streams for multiplication in the electronic domain.

FIGS. 6A and 6B illustrate schematics of neurons that receive optical digital inputs and multiply signals and weights in the electronic domain. These neurons can be used in addition to or instead of the homodyne receiver neuron 131 in FIG. 1D. Each of these neurons can include, for example, about 10 to about 100 transistors, which can occupy only a few $\mu m^2$, including photodetectors in the signal and weight receivers.

FIG. 6A shows a neuron 600 with a digital signal detector 640 and a digital weight detector 630 that receive serialized multi-bit optical digital data signals and serialized multi-bit optical weight signals, respectively. An electronic processor 620 coupled to the digital signal detector 640 and the digital weight detector 630 multiplies the signals and weights in the electronic domain to produce a serialized electronic signal. A transmitter 610 coupled to the electronic processor 620 emits a serialized multi-bit optical signal formed by modulating an optical carrier with the serialized electronic signal.

FIG. 6B shows a neuron 602 that detects bits in parallel instead of in series. This receiver 602 includes a multi-element digital signal detector 642 and a multi-element digital weight detector 632, where the number of elements in each detector determines the precision. For example, to implement four bits of precision, the signal receiver 642 and the weight receiver 632 each include four detector elements. The signals from the signal receiver 642 and the weight receiver 632 are then multiplied either using digital processors or analog processors (electronic processing circuitry 622) in the neuron to produce an electronic. A transmitter 610 coupled to the electronic processing circuitry 622 emits a multi-bit optical signal formed by modulating an optical carrier with the electronic signal.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for implementing an optical neural network, the apparatus comprising:

a first layer of neurons to emit a first array of data signals $x_j$ at a first optical frequency, where j=1, 2, . . . N, and N is a positive integer;

a second layer of neurons, each neuron in the second layer of neurons configured to calculate a weighted average $y_i$ of the first array of data signals, where $y_i$=sum ($w_{ij}x_j$), $w_{ij}$ is a weight, i=1, 2 . . . M, and M is a positive integer; and an optical weight transmitter, in optical communication with the second layer of neurons, to transmit an array of weight signals at a second optical frequency towards the second layer for calculating the weighted average $y_i$, where the weight signals represent the weight $w_{ij}$, wherein each neuron in the second layer comprises:

a homodyne receiver, operably coupled to the first layer and the optical weight transmitter, to generate a weighted product between each data signal in the first array of data signals and a corresponding weight signal in the array of weight signals; and an integrator, operably coupled to the homodyne receiver, to calculate the weighted average $y_i$ from the weighted products.

2. The apparatus of claim 1, wherein the integrator comprises at least one of an RC filter or an integrating operational amplifier.

3. The apparatus of claim 1, wherein each neuron further comprises a nonlinear function unit to generate an output $z_i$ from the weighted average $y_i$.

4. The apparatus of claim 3, wherein each neuron further comprises a neuron transmitter to transmit the output $z_i$ to a third layer in the optical neural network.

5. An apparatus for implementing an optical neural network, the apparatus comprising:

a first layer of neurons to emit a first array of data signals $x_j$ at a first optical frequency, where j=1, 2, . . . N, and N is a positive integer;

a second layer of neurons, each neuron in the second layer of neurons configured to calculate a weighted average $y_i$ of the first array of data signals, where $y_i$=sum ($w_{ij}x_j$), $w_{ij}$ is a weight, i=1, 2 . . . M, and M is a positive integer; and an optical weight transmitter, in optical communication with the second layer of neurons, to transmit an array of weight signals at a second optical frequency towards the second layer for calculating the weighted average $y_i$, where the weight signals represent the weight $w_{ij}$, wherein the second optical frequency is greater than the first optical frequency by at least about 2π×20 GHz.

6. The apparatus of claim 1, wherein the optical weight transmitter comprises an array of grating couplers.

7. The apparatus of claim 1, wherein each neuron in the first layer is configured to transmit a copy of the first array of data signals $x_i$ in a serial manner toward every neuron in the second layer.

8. The apparatus of claim 1, wherein the first layer of neurons and the second layer of neurons are in a first optical neural network and further comprising:

a second optical neural network, in optical communication with the first optical communication with the optical weight transmitter, to compute a product of another array of data signals with the array of weight signals.

9. A method for implementing an optical neural network, the method comprising:

transmitting a first array of data signals $x_j$ at a first optical frequency from a first layer of neurons in the optical neural network to a second layer of neurons in the optical neural network, where j=1, 2, . . . N, and N is a positive integer;

transmitting an array of weight signals at a second optical frequency to the second layer for calculating a weighted average $y_i$, where the weight signals represent the weight $w_{ij}$; and calculating the weighted average $y_i$, of the first array of data signals at the second layer of neurons, where $y_i$=sum ($w_{ij}x_j$), $w_{ij}$ is a weight, i=1, 2 . . . M, and M is a positive integer, wherein calculating the weighted average comprises:

generating, at a homodyne receiver, a weighted product between each data signal in the first array of data signals and a corresponding weight signal in the array of weight signals; and integrating the weighted products to form the weighted average $y_i$.

10. The method of claim 9, further comprising transmitting an output $z_i$, from the second layer in the optical neural network to a third layer in the optical neural network.

11. The method of claim 9, further comprising:

transmitting a copy of the first array of data signals $x_i$ in a serial manner toward every neuron in the second layer.

12. The method of claim 9, wherein the first layer of neurons and the second layer of neurons are in a first optical neural network and further comprising:

transmitting the array of weight signals to a layer in a second optical neural network.

13. An optical processing system comprising:

a plurality of optical neural networks; and an optical weight transmitter, in optical communication with the plurality of optical neural networks, to transmit an array of weight signals to each optical neural network in the plurality of optical neural networks, wherein each optical neural network in the plurality of optical neural networks comprises:

a homodyne receiver, operably coupled to the first layer and the optical weight transmitter, to generate a weighted product between a corresponding weight signal in the array of weight signals and a corresponding data signal in an array of data signals and; and an integrator, operably coupled to the homodyne receiver, to calculate a weighted average from the weighted product.

14. The optical processing system of claim 13, wherein the optical weight transmitter is integrated in a photonic integrated circuit and comprises a grating coupler to couple the array of weight signals to the plurality of optical neural networks.

* * * * *

UNITED STATES PATENT AND TRADEMARK OFFICE

CERTIFICATE OF CORRECTION

PATENT NO. : 11,373,089 B2
APPLICATION NO. : 16/268578
DATED : June 28, 2022
INVENTOR(S) : Englund It is certified that error appears in the above-identified patent and that said Letters Patent is hereby corrected as shown below:

In the Claims

Column 13, Line 1 replace "weighted average $y_i$, of the first" with – weighted average $y_i$ of the first –

Column 13, Line 13 replace "an output $z_i$, from the second" with – an output $z_i$ from the second –

Signed and Sealed this
Eighteenth Day of October, 2022

Katherine Kelly Vidal

Katherine Kelly Vidal
*Director of the United States Patent and Trademark Office*